No. 649,940.  
Patented May 22, 1900.  
G. A. LONG.  
GRAIN SEPARATOR.  
(Application filed Mar. 10, 1898. Renewed Oct. 16, 1899.)  
(No Model.)  
3 Sheets—Sheet 1.
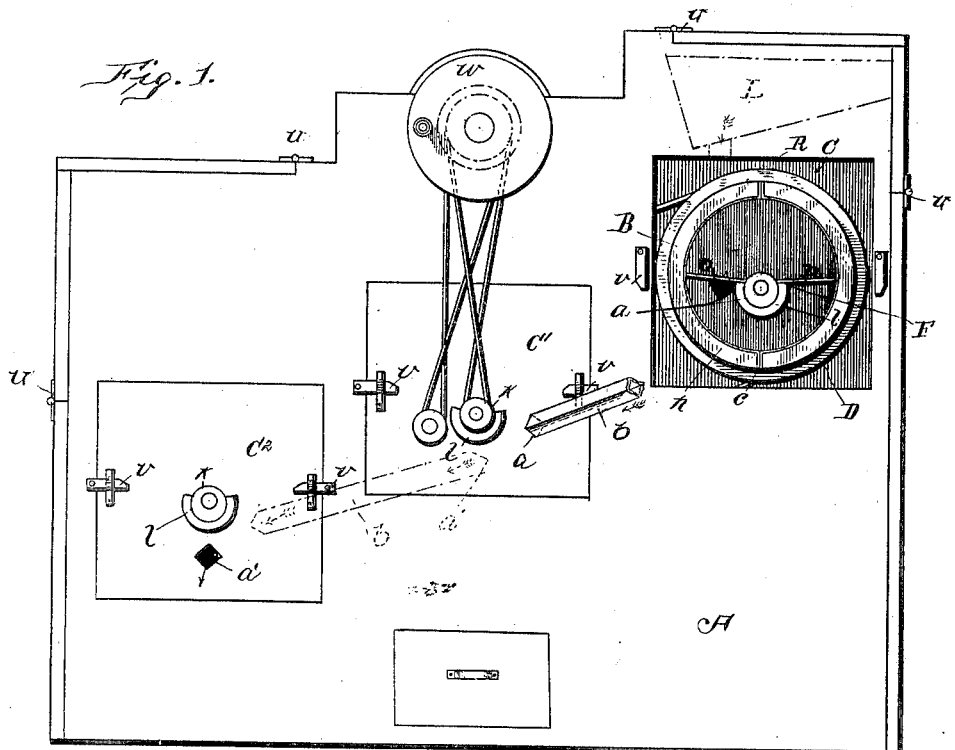
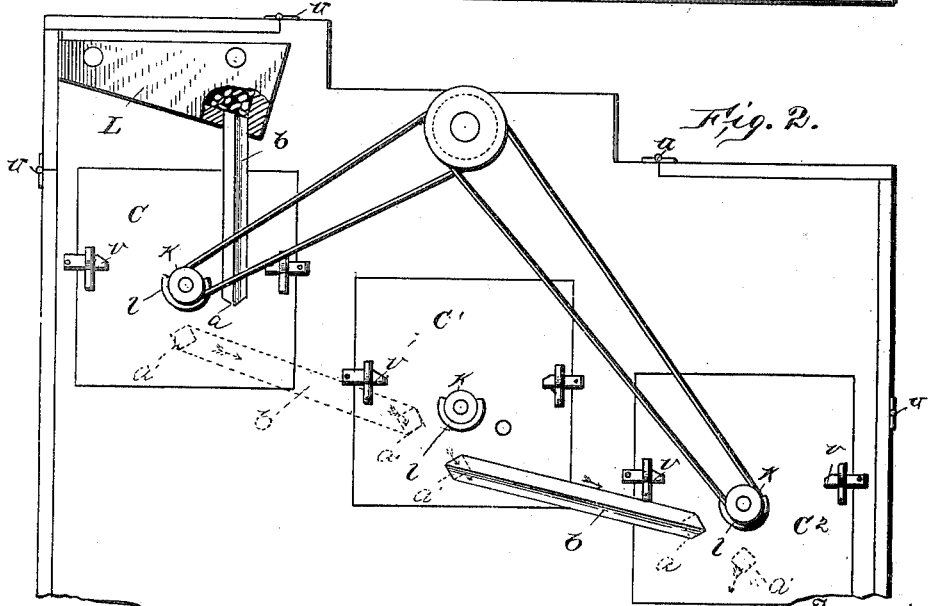
Witnesses  
F. C. Barry  
M. H. Haskell
Inventor  
G. A. Long  
per J. E. Duffy  
Attorney No. 649,940. Patented May 22, 1900.
G. A. LONG.
GRAIN SEPARATOR.
(Application filed Mar. 10, 1898. Renewed Oct. 16, 1899.)
(No Model.) 3 Sheets—Sheet 2.
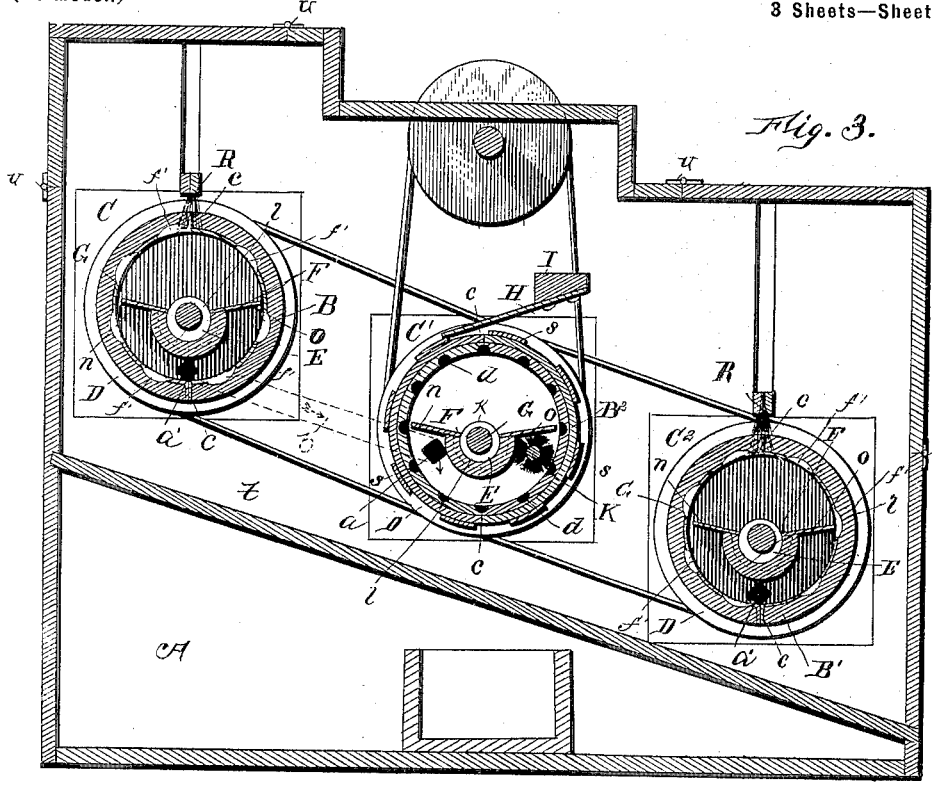
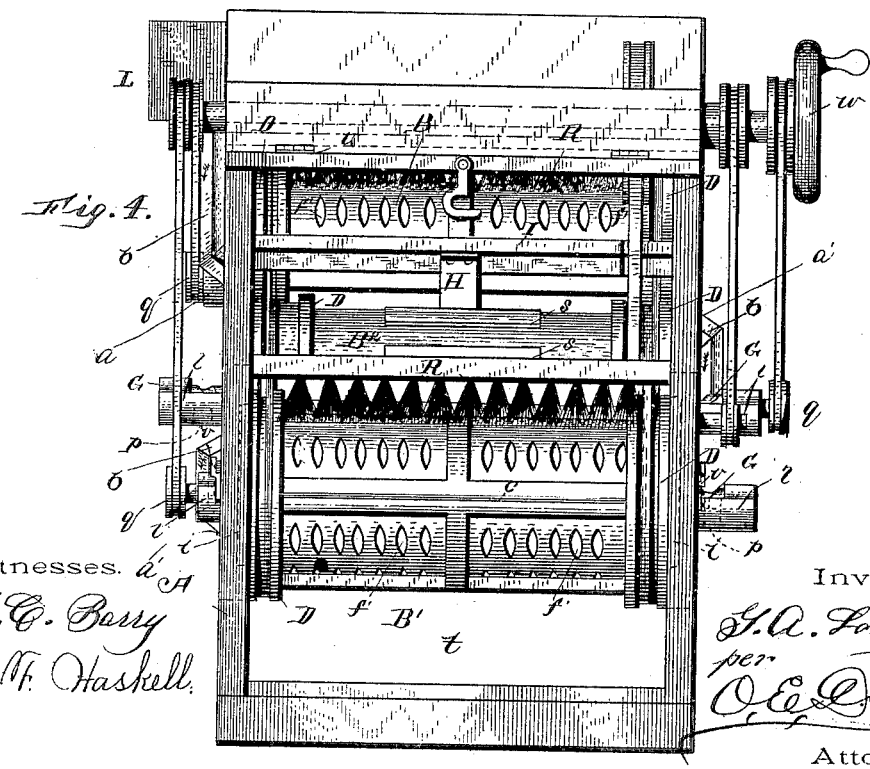
Witnesses.
F. C. Barry
M. F. Haskell
Inventor.
G. A. Long
per
O. E. Duffy
Attorney.

No. 649,940. Patented May 22, 1900.
G. A. LONG.
GRAIN SEPARATOR.
(Application filed Mar. 10, 1898. Renewed Oct. 16, 1899.)
(No Model.) 3 Sheets—Sheet 3.
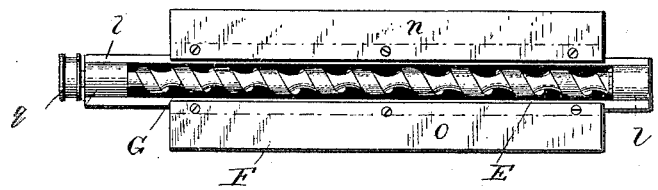
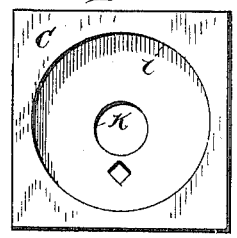
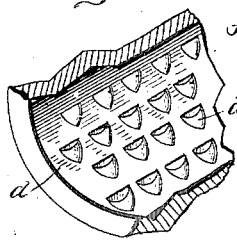
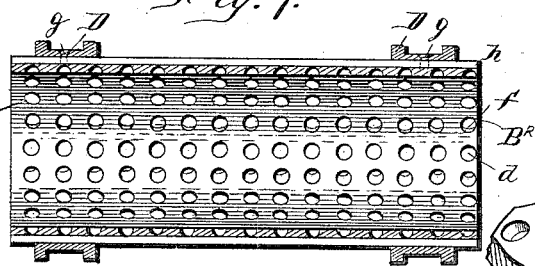
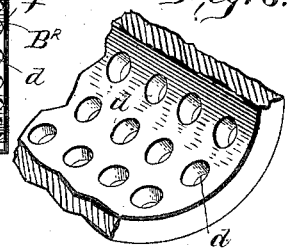
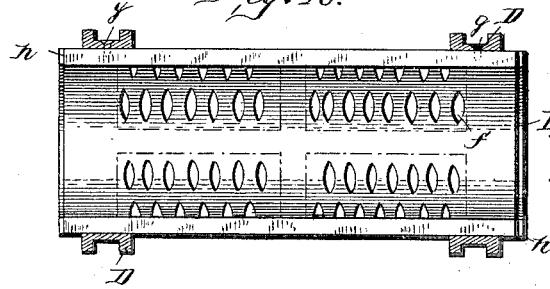
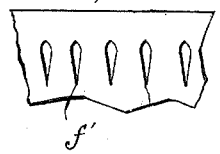
Witnesses.
F. E. Barry
M. F. Haskell.
Inventor.
G. A. Long.
per
Attorney.
THE NORRIS PETERS CO., PHOTO-LITHO., WASHINGTON, D. C.

UNITED STATES PATENT OFFICE.

GEORGE A. LONG, OF ANTWERP, OHIO.

GRAIN-SEPARATOR.

SPECIFICATION forming part of Letters Patent No. 649,940, dated May 22, 1900.

Application filed March 10, 1898. Renewed October 16, 1899. Serial No. 733,825. (No model.)

*To all whom it may concern:*

Be it known that I, GEORGE A. LONG, of Antwerp, in the county of Paulding and State of Ohio, have invented certain new and useful Improvements in Grain-Separators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to grain-separators, and has for its object to provide improved machinery of this class for separating cockle and other refuse from the grain and for separating the various kinds of grain from each other or different grades of the same grain.

With this object in view the invention consists in the improved construction, arrangement, and combination of parts hereinafter fully described and afterward specifically pointed out in the claims.

In the accompanying drawings, Figure 1 represents a view in elevation of that side of the machine upon which the fly-wheel is mounted. Fig. 2 represents a view of the opposite side. Fig. 3 is a vertical longitudinal sectional view of the machine. Fig. 4 is a view in end elevation with a portion of the casing removed. Fig. 5 is a plan view showing the trough, table, and spiral conveyer. Fig. 6 is a longitudinal vertical sectional view through the trough and conveyer. Fig. 7 is a view of one-half of a separating-cylinder with pockets approximating in shape a grain of wheat. Fig. 8 is a fragmentary view of part of the same in perspective section. Fig. 9 is a similar view of part of a cylinder having pockets tapered on one side and straight on the other. Fig. 10 is a view similar to Fig. 7, showing half a cylinder, with pockets approximating in shape a grain of rye. Fig. 11 is a view of part of a cylinder having pockets approximating the shape of grains of oats. Fig. 12 is an enlarged longitudinal vertical section through part of the upper surface of one of the perforated cylinders. Fig. 13 is a view in side elevation of one of the brushes. Fig. 14 is a perspective view of one of the rings for securing the two halves of a cylinder together and which also serve as belt-pulleys for rotating the cylinders.

Like letters of reference mark the same parts in all the figures of the drawings.

Referring to the drawings, A marks the casing, which is shown as rectangular in shape, but which may be of other shape, if desired. In the sides of the casing A are a series of openings through which to insert the cylinders endwise, doors C, C', and $C^2$ being fitted to said openings. The openings, cylinders, and doors are arranged in series in different vertical and horizontal planes in such manner that the bottom of the upper cylinder is above the center of the next lower cylinder and so on to the lowest cylinder, so that the grain will pass from the lower end of one cylinder into the next cylinder just below its center, passing in at $a$, at one end of the highest cylinder B, out of that cylinder at $a'$, at its lower end, into chutes or pipes $b$, suitably secured in openings $a^2$ in the doors C, C', and $C^2$, being conveyed therethrough from one cylinder to the next until discharged at the lower end of the lowest cylinder, the inlet-point of each cylinder being marked $a$ and the discharge-point $a'$.

The cylinders B B' are made in sections, as shown in Figs. 7 and 10, the main body and edge flanges being made of a single piece of sheet metal for each section, such sheet metal being formed with pockets, as shown at $d$ in Figs. 3, 8, 9, and 11, and such pockets made of approximately the shape of the grain to be lodged or retained in them, being preferably formed by punching outward with a suitable tool and forming a perforation with side walls or burs without the removal of any of the metal. The perforations are also shown at $ff$ in Figs. 7 and 10, those in Fig. 7 being intended to receive grains of wheat and those in Fig. 10 grains of rye, while those of Fig. 11 are intended to receive grains of oats.

The cylinders may be made with pockets, as indicated in Fig. 7, in which the pockets are simply depressions of the desired shape, no hole being made through the material of the cylinder, as in Figs. 10 and 11.

The cylinders are arranged to be made removable and interchangeable, so that any one can be taken out of the machine and another to receive another kind or size of grain substituted for it when desired.

The sections of each cylinder are clamped together by means of rings D, which hold them securely together, and are provided with external circumferential grooves to receive belts by which the cylinders are rotated, the rings being secured by screws $g$ or any other suitable fastening. The ends $h$ of the cylinders form their journals, and they have their bearings in circular recesses $i$, formed in the doors C C' C².

When it is desired to remove a cylinder from the machine, the doors are taken off and the cylinder pulled out lengthwise, and when a cylinder for a different grain is required the rings D are taken off, the sections of the cylinder removed from the machine and secured on the one to be substituted, which may then be placed in position in the machine.

The doors are substantially alike, being square in outline, the recesses $i$, before mentioned, being formed in their inner faces, and in the door below its center is a hole $k$, in which journal-boxes $l$ are placed, in which are supported a central trough E and table F, the outer ends of the trough forming bearings for the journals of a spiral or screw conveyer G. (See Figs. 5 and 6.) The table F is formed of two leaves $n$ and $o$, secured to and projecting laterally from the trough E, one on each side, extending the whole length of the trough, one leaf reaching close enough to the side of the cylinder to prevent the passage downward of grain and the other at a sufficient distance from the opposite side of the cylinder to permit the passage upward of the grain lodged in the pockets without interference. The leaves incline downwardly and inwardly toward the trough, so that grain dropped out of the pockets on the upper inner side of the cylinder will slide down the leaves into the trough to be carried to the discharge end by the conveyer. The neck of the trough at the discharge end projects beyond the door and is provided in its under side with an opening $p$, through which the grain is discharged into the chutes.

The spiral conveyers G are rotated by belt on pulleys $q$ from a suitable driven pulley.

Over the cylinders B B' are mounted brushes $r$, extending the full length of the cylinders, said brushes being mounted in vertical grooves with their bristles bearing on the outside of the cylinders at the top and serving to force inward anything lodged in the punched-out pockets, causing it to drop inward upon the table F and leaving the pockets clear to take up other grain, &c.

The pockets in cylinder B² being not extended through the shell of the cylinder, a longitudinal rotary brush K is mounted inside of it, so as to contact with its interior as the cylinder and brush rotate, the bristles of this brush being arranged spirally to feed the matter which it removes from the pockets longitudinally of the cylinder to discharge it at the end thereof, whence this matter is conveyed to the next or succeeding cylinder and again submitted to the operation of separating to further clear it of refuse, &c., or to remove from it good grain which may remain.

The middle cylinder B² is provided on its outside with projections $s\ s$, which as the cylinder revolves pass under and raise a spring H, which drops off one projection and strikes the next or the shell of the cylinder, which so jars the cylinder as to cause the grain to surely drop out of the inverted pockets upon the table F to be handled by the conveyer G.

The various cylinders and conveyers are rotated in the proper directions by suitable belts and pulleys, to which I make no claim, being of any well-known style or arrangement.

The operation is as follows: The grain is put in hopper L, Fig. 2, and passes at $a$ into and through the conduit or chute $b$ to the inside of cylinder C, then into the separator above described, to the opposite end of the cylinder, to the discharge, one kind of grain passing out at the bottom of the cylinder, while the other grain or foreign matter passes out of the conveyer, as shown at $p$, Figs. 4 and 6. When the grain enters middle cylinder B², the operation is reversed. In all instances the grain enters one end of the cylinder and discharges at the other end, the grain being conveyed through suitable conduits. Much dust and dirt screens through the perforated cylinder to the inclined bottom $f$, from which it is carried off. Parts of the casing or frame may be in sections and hinged, as at $u\ u$, for easy access, and the doors C C' C² may be secured by any well-known fastening, as at $v\ v$. The doors should fit their openings very snugly, but not too tightly, as they may have to be removed very frequently for the removal and insertion of different cylinders. Any usual and well-known motive power may be employed. In this instance only a hand-wheel is shown, as seen at $w$.

Modifications and changes of the arrangement of the several parts may be made within the scope and spirit of my invention, and I do not therefore wish to be confined to the exact forms shown and described, but consider myself entitled to all such modifications.

Having described my invention and illustrated the best means of carrying the same into effect, what I claim as new, and desire to secure by Letters Patent, is—

1. The combination in a grain-separator of the casing having openings, doors fitted in said openings and having circular recesses in their inner faces of the size of the cylinder ends, and the cylinder ends adapted to form journals and mounted and supported in the recesses in the doors which form the bearings therefor, substantially as set forth.

2. The combination in a grain-separator of the cylinders made in sections of halves, a driving pulley-ring securing said sections together, the end of said cylinders forming journals and adapted to operate in journal-bearings formed by recesses in the doors, whereby when the doors are removed the cylinders are accessible substantially as set forth.

3. The combination in a grain-separator of the doors recessed as described, the cylinders having ends forming journals to fit said recesses, conveyers in said cylinders, and the conduits or chutes carried by said doors for communication between the cylinders as set forth.

In testimony that I claim the foregoing as my own I affix my signature in presence of two witnesses.

GEORGE A. LONG. [L. S.]

Witnesses:
GEO. B. TERWILLEGER,
SYLVENUS MUNSON.